(12) United States Patent
Gasnault et al.

(10) Patent No.: US 6,957,316 B1
(45) Date of Patent: Oct. 18, 2005

(54) READER FOR STANDARDS AND CODES STORED IN ELECTRONIC FORM

(75) Inventors: Jean Gasnault, Paris (FR); Thierry Jacomet, Paris (FR); Frédéric Seneczko, Maizy (FR)

(73) Assignee: Henri de Neuville, Paris (FR)

( * ) Notice: Subject to any disclaimer, the term of this patent is extended or adjusted under 35 U.S.C. 154(b) by 0 days.

(21) Appl. No.: 09/869,613

(22) PCT Filed: Dec. 29, 1999

(86) PCT No.: PCT/FR99/03312

§ 371 (c)(1),
(2), (4) Date: Oct. 22, 2001

(87) PCT Pub. No.: WO00/41086

PCT Pub. Date: Jul. 13, 2000

(30) Foreign Application Priority Data

Dec. 30, 1998 (FR) .................................. 98 16669

(51) Int. Cl.⁷ .......................................... G06F 12/00
(52) U.S. Cl. ..................................... 711/211; 711/115
(58) Field of Search ................................ 711/115, 211

(56) References Cited

U.S. PATENT DOCUMENTS

| | | | | |
|---|---|---|---|---|
| 4,639,225 A | * | 1/1987 | Washizuka ................... 434/308 |
| 4,899,306 A | * | 2/1990 | Greer .......................... 710/64 |
| 5,199,104 A | * | 3/1993 | Hirayama .................... 345/776 |
| 5,208,745 A | * | 5/1993 | Quentin et al. ............... 700/83 |
| 5,239,665 A | * | 8/1993 | Tsuchiya ...................... 345/776 |
| 5,339,091 A | * | 8/1994 | Yamazaki et al. ........... 345/104 |
| 5,534,888 A | * | 7/1996 | Lebby et al. ................ 345/672 |
| 5,661,635 A | * | 8/1997 | Huffman et al. ............ 361/684 |
| 5,671,374 A | | 9/1997 | Postman et al. |
| 5,887,118 A | * | 3/1999 | Huffman et al. ............ 392/390 |
| 6,014,040 A | * | 1/2000 | Tracy .......................... 326/90 |
| 6,155,838 A | * | 12/2000 | Hyman et al. .............. 434/322 |
| 6,690,417 B1 | * | 2/2004 | Yoshida et al. ........... 348/231.1 |

FOREIGN PATENT DOCUMENTS

WO      WO 97/20274 A1      6/1997
WO      WO 97/23819 A1      7/1997

* cited by examiner

*Primary Examiner*—Hiep T. Nguyen
(74) *Attorney, Agent, or Firm*—Browdy and Neimark, PLLC

(57) ABSTRACT

The invention concerns a device for storage and search of textual and graphic data in electronic form, said device comprising display means, user-interface means, control means, means for storing said data, means for selecting data to be displayed according to the user's instructions. The invention is characterized in that it comprises a multiplexed address bus.

9 Claims, 4 Drawing Sheets

READER FOR STANDARDS AND CODES STORED IN ELECTRONIC FORM

REFERENCE TO RELATED APPLICATIONS

The present application is the national stage under 35 U.S.C. §371 of international application PCT/FR99/03312, filed Dec. 29, 1999 which designated the United States, and which application was not published in the English language.

The present invention relates to the field of devices for storage and retrieval of information in electronic form. More particularly it relates to a reader for texts of standards, codes etc., of a format equivalent to that of a book.

Devices are already known for storage and retrieval of information in electronic form, such as "organizers", pocket computers, electronic translators etc.

These devices have the drawback that they are still of relatively limited storage capacity, and, as a corollary, they do not permit sufficiently rapid access to a very large volume of information. Finally, they are relatively expensive and therefore their field of application remains limited.

The aim of the present invention is therefore to remedy the drawbacks mentioned above.

To this end it proposes a device for storage and searching of textual and graphical information in electronic form, the said device comprising a display means, a user interface means, an operating means, a means of storing the said information, a means of selecting information to be displayed according to the user's instructions, characterized in that it includes a multiplexed address bus.

The product makes it possible to search an article or text automatically, according to a numerical or alphabetical input captured manually at the keyboard.

For a doctor, for example, searching for a medicine or for a contra-indication of the latter, or searching for textual or numerical information by theme, will be effected by means of an alphabetic input entered at the keyboard.

For a lawyer, searching of a legal text will be effected by the acquisition of a numerical input from the keyboard.

So as to simplify the architecture of the device and reduce its cost, the operating means is preferably an eight-bit processor combined with an IPP (Intelligent Programmable Peripheral).

According to the preferred embodiment, it has an internal communication bus of type I2C.

So as to make it possible to take account of regularly updated data, the storage means is a memory card that can be removed from the case.

According to a preferred embodiment, the device has a printer port.

It will be understood that, as the device according to the invention is equipped initially with a 9600-baud RS232C printer output, the data thus displayed can be printed, which is especially useful when searching a legal article or a text from case law, for example.

The invention also relates to a method of searching textual or graphical information stored in electronic form, characterized in that it comprises the following steps:

at the time of opening of the device according to the invention (with a memory card already inserted in its housing), a step in which the stored database gives, as starting information, the number of pages to be displayed and the start address of the text mode, a time delay step for detecting whether there is a long delay without data input from the keyboard, in this case, a step of access to the database in graphical mode containing for example advertising screens or screens of other information, and as long as all the images have not been displayed, or no keyboard activity is detected, maintenance of graphical display, if a key is activated or all the images have been displayed, return to the initial step, to the stored database and to the first page displayed (a page showing the contents of the text memory for example), during keyboard processing, passing through a succession of hierarchical menus permitting access either to graphical information, or to the various kinds of information stored, and, in a selected set of information, access to a particular page, scrolling through the pages forwards and backwards by means of the keyboard, or direct selection of an item from a list.

The description and drawings of a preferred embodiment of the invention, given below, will provide a better understanding of the aims and advantages of the invention. This description is of course given as an example, and is not limiting. In the drawings.

DESCRIPTION

Figure 1:
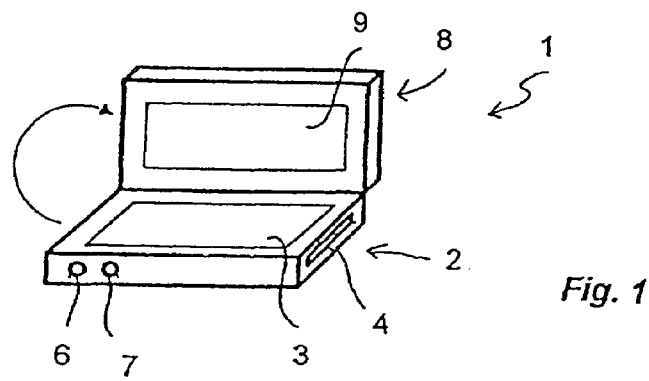
FIG. 1 is a schematic diagram of the device according to the invention.

As can be seen in FIG. 1, a device according to the invention is in the form of a case 1 that can be opened, roughly in the shape of a parallelepiped, of the size of a paperback, or of a legal code. In the example described, its dimensions are roughly as follows: height=28 mm, width=70 mm, length=115 mm, weight≦250 g.

It has a bottom part 2 where a keyboard 3 is accessible for input of instructions by the user. The bottom part 2 also has on its edge a slot 4 for insertion of a memory card 5 (not visible in the diagram), containing data representing texts, for example articles of law, or the texts of standards, stored in electronic form in memory components.

The bottom part 2 of case 1 has, on its front face, on the one hand, a socket 6 for connecting a conventional electrical supply lead, for example of the 9 V d.c. type, and, on the other hand, a printer port 7 permitting connection to a printer, by means of a conventional PC printer cable, such as RS232C.

Case 1 has in addition a top part 8 that can be opened, and having a flat screen 9. The device is switched on either with a conventional switch (not shown), or by detection of the opening of case 1.

The two parts 2, 8 of case 1 are hinged in a manner known to a person skilled in the art. This makes it possible to orientate the flat screen 9 over a wide range of angles relative to the bottom part 2 of case 1, for the user's comfort.

Figure 2:
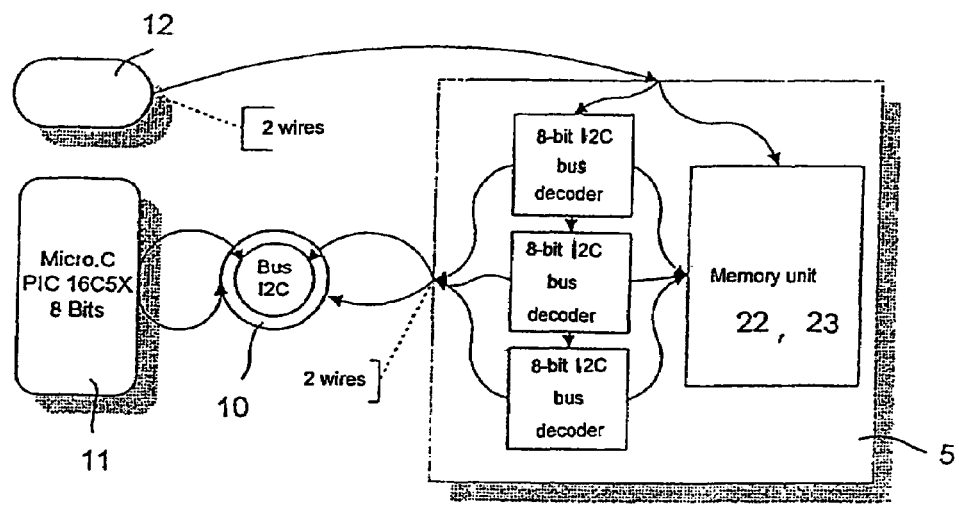
FIG. 2 is a functional diagram of the device.

With regard to the internal architecture of the device, shown schematically in FIG. 2, the main difficulty, if we exclude the development of methods for automatic adaptation and identification of subjects, is connected with the means to be employed to make it possible to address several megabytes using a low-cost technology, with a minimum of connections, and having a high speed of execution, low electric power consumption, a low volume/weight ratio for portability, and to have expansion possibilities for various options, or adaptations.

The memory size required for storing a text such as the penal code is about 1 Megabyte. In the case of storage of 8 law codes, the minimum capacity must then be about 8 Megabytes, i.e. 64 megabits, one byte being equivalent to one character.

In binary this represents 2(23) (2 to the power of 23), i.e. an address bus must have as a minimum twenty-three connections to a memory card 5, eight connections for a data bus, two connections for an electric power supply 12, and four control connections (for commands of type /CS, /RD, /WR, /E), the technology of the processor 11 for this type of addressing is then at the minimum 32 bits. The drawbacks of this 32-bit technology are the volume (in PLCC there are 68 connecting legs), and the high power consumption (50 mA).

Since the memory card 5 must be removable so as to be able to offer users a subscription contract of the data updating type, the connector should moreover have at least 37 connections on this basis. Obviously this option is prohibitive in terms of complexity and production costs.

Accordingly, the device uses a multiplexed address bus 10, so as to make it possible to reduce the size of the processor 11. With addressing by multiplexing, it is possible to employ an eight-bit processor combined with an IPP (Intelligent Programmable Peripheral), addressing is at the maximum 2(24), i.e. 16 Megabytes.

The device uses a microcontroller 11 possessing its own IPP (Intelligent Programmable Peripheral), in RISC technology and HARVARD internal architecture. In fact, the other conventional processors, of type 6800 (from Motorola), Z80 (from Zilog) or 80C196 (Intel) operate with a common architecture, called VON-NEUMANN, but this older architecture has numerous shortcomings when we require to combine performance with speed of execution.

The microcontroller 11 chosen, in the device described as an example, is a PIC16C5X from the company MICRO-CHIP. It is organized in 12-bit words, which makes it possible to code, on a single word, the instruction and the operand or its address (in the broad sense of the term). The code produced is thus very compact.

The data from the main memory of the microprocessor (serving for execution of the main program, which calls data stored in the other memory stores) then enters an instruction decoder which acts simultaneously on the microcontroller 11 or an ordinal counter.

The clock frequency is fixed by a quartz crystal at 20 MHz in the example described.

The choice of communication bus determines the number of connections to the memory card 5, and the expandability of the machine.

The device according to the invention uses an internal communication bus.

For the device according to the invention, the bus 10 chosen is the I2C bus developed by Philips. Numerous peripherals have been developed by various companies for this bus: real time clock, RAM and E2PROM memories, input/output module, drivers, etc., making it possible to envisage possible extensions for the device.

The power supply 12 of the device according to the invention is provided by an ordinary battery or a rechargeable battery. If it is used with a rechargeable battery then recharging of the latter, with a suitable charger, uses the power supply socket 6 located on the front face of the device.

The internal power supply of the device uses a constant-power switching regulator (400 kHz) to transform the voltage of the ordinary or rechargeable battery to 5 V. A warning light on the front face of the keyboard can inform the user that the energy available in the ordinary or rechargeable battery is low, and that it should be replaced or recharged as soon as possible. The total consumption is about 15 mA for a supply voltage of 9 V.

The ordinary or rechargeable battery has, in the non-limiting example described, the following characteristics: dimensions W 26.5×H 17.5×L 48.5 mm, weight=38 g, voltage 9 V at 550 mA.

With a rechargeable battery, the device according to the invention can be used independently for about 30 hours.

Figure 3:
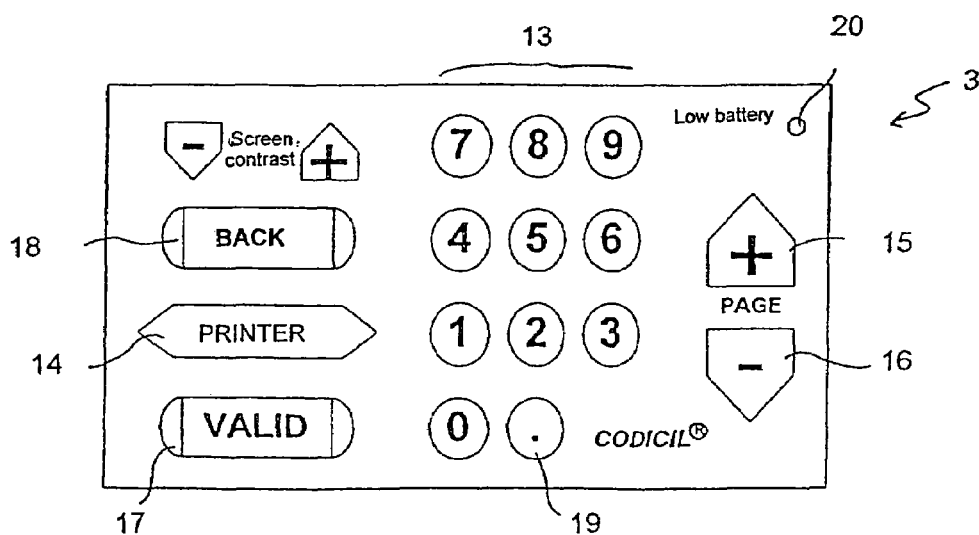
FIG. 3 shows the keyboard interface.

The numerical keyboard 3 has 18 keys according to the following list of functions:

Keys from "0 to 9" 13 for capture of numerical data.
Key "Printer" 14 for a paper printout.
Key "+"15 for screen page advance.
Key "−"16 for page return.
Key "Valid" 17 for confirming data.
Key "Back" 18 for return to the main menu.
Key "." 19 as separator of numerical data.
Adjustment of screen contrast with two keys (not shown).
Keyboard 3 (FIG. 3) can be made by various technologies. The device according to the invention employs a flat keyboard, also known as a "sandwich keyboard", of a type that is already known.

The dimensions of the keyboard are: L 105 mm×160 mm×h 1 mm.

The advantages of this type of keyboard are: variations in shapes of the keys, choice of colours available, height of the keyboard (1 mm), low cost of manufacture.

Keyboard 3 has at the top a light-emitting diode 20, illumination of which indicates low voltage of the battery, according to a conventional setup.

The flat screen 9 used in the device is of the liquid crystal type (LCD). It can display 10 lines of 26 characters in text mode, and 160 by 80 pixels in graphics mode. It can, for example, be of the type marketed under the name DGI 6080 made by DATA-VISION. With this type of display it is possible to display letter symbols with accents.

The device according to the invention has, as we have seen, a printer port 7, so that the information displayed on the flat screen 9 can be printed on thermal paper or some other type of paper (depending on the printer connected).

A printer compatible with the device must have the following characteristics:

1) receiving rate RS232C 9600 baud (bps).
2) buffer store of 512 bytes minimum,
3) connecting cable with a length of less than 10 meters.

Each removable memory card 5 uses, as has been explained, the I2C communication bus. Each memory card 5 is organized as follows.

Card 5 is generally of rectangular format, for example with size of about 5 cm×10 cm, and is intended to be inserted into case 1 by sliding into it, in the direction of its length.

Figure 4:
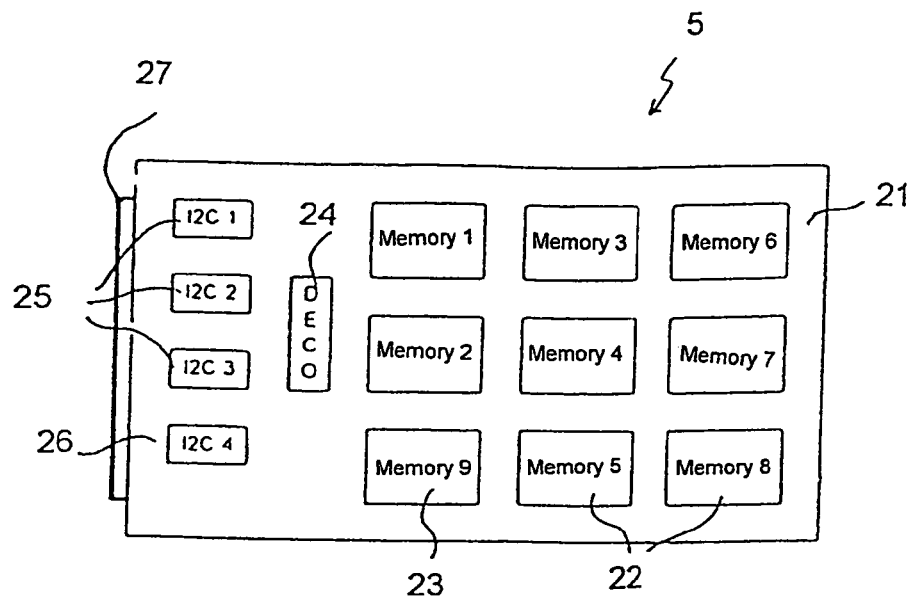
FIG. 4 shows the arrangement of the memory card

Card 5 is made in the form of a four-layer printed circuit 21 (FIG. 4), on which memory components 22, 23 are mounted. In the example described here, eight memory components 22 serve for storing information, texts and graphics that can be consulted by the user. A memory component 23 stores information for identification and personalization of the memory card 5.

The printed circuit 21 also carries a decoder component 24, intended for memory selection, and I2C bus decoder components. Three bus decoder components 25 serve for addressing the memories, and a bus decoder component 26 serves for transferring the stored information read in the memory components 22 to the I2C bus.

On one edge of memory card 5 there is a connecting strip 27 for connecting it to the device when it is inserted in case 1.

The manner of production of the card and the choice of components are of a conventional type known to a person skilled in the art.

So as to reduce the memory size of the stored information, textual information is, in the example described here, stored as text only (ASCII format).

Figure 5:
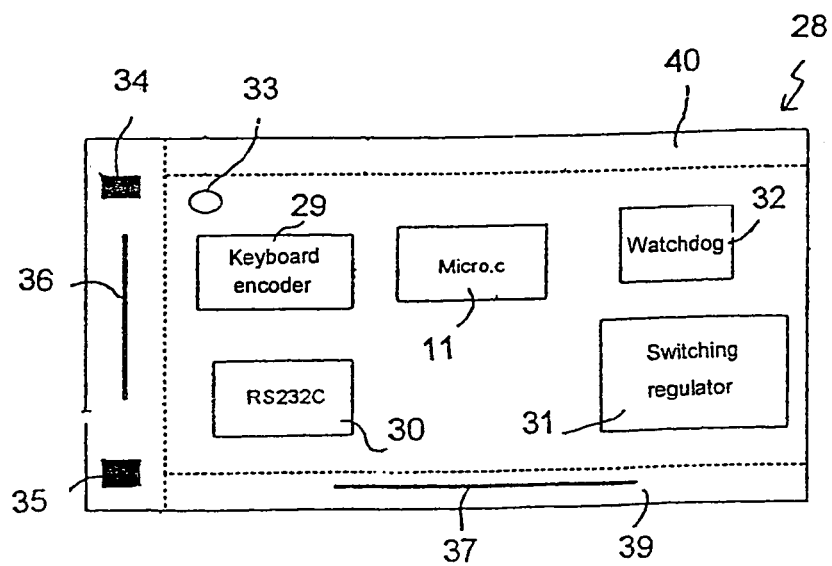
FIG. 5 shows the arrangement of the microcontroller card

Microcontroller 11 is arranged on a microcontroller card 28 (shown schematically in FIG. 5) which manages the whole device.

The microcontroller card 28 is arranged in the bottom part 3 of case 1, under the keyboard 3, and is of a general rectangular shape.

It is made in the form of a four-layer printed circuit of a conventional type, and has, in addition to microcontroller 11:

- a keyboard encoder component 29, which provides coding of the keyboard and manages anti-bounce of the keys,
- an RS232C connecting component 30, which converts the logic signals coming from microcontroller 11 for series connection to a printer.
- a switching regulator 31, for power supply of the device,
- a "watchdog" component 32, for continuous checking of proper running of the program, for monitoring power supply, and for controlling reset and powering-up of the device,
- a light emitting diode 33 for indicating low battery,
- a connector 34 for a battery charger,
- an RS232C connector 35,
- a connecting strip 36 to keyboard 3,
- a screen connector 37,
- a connector 38 of memory card 5, arranged underneath the microcontroller card 28
- on the bottom surface, guide bars 39, 40 for guiding a memory card 5 during its insertion into case 1.

This microcontroller card 28 was developed in accordance with the requirements of standards for electromagnetic compatibility (CEM) directive 89/336 and directive 92/31.

Operation

Figure 6:
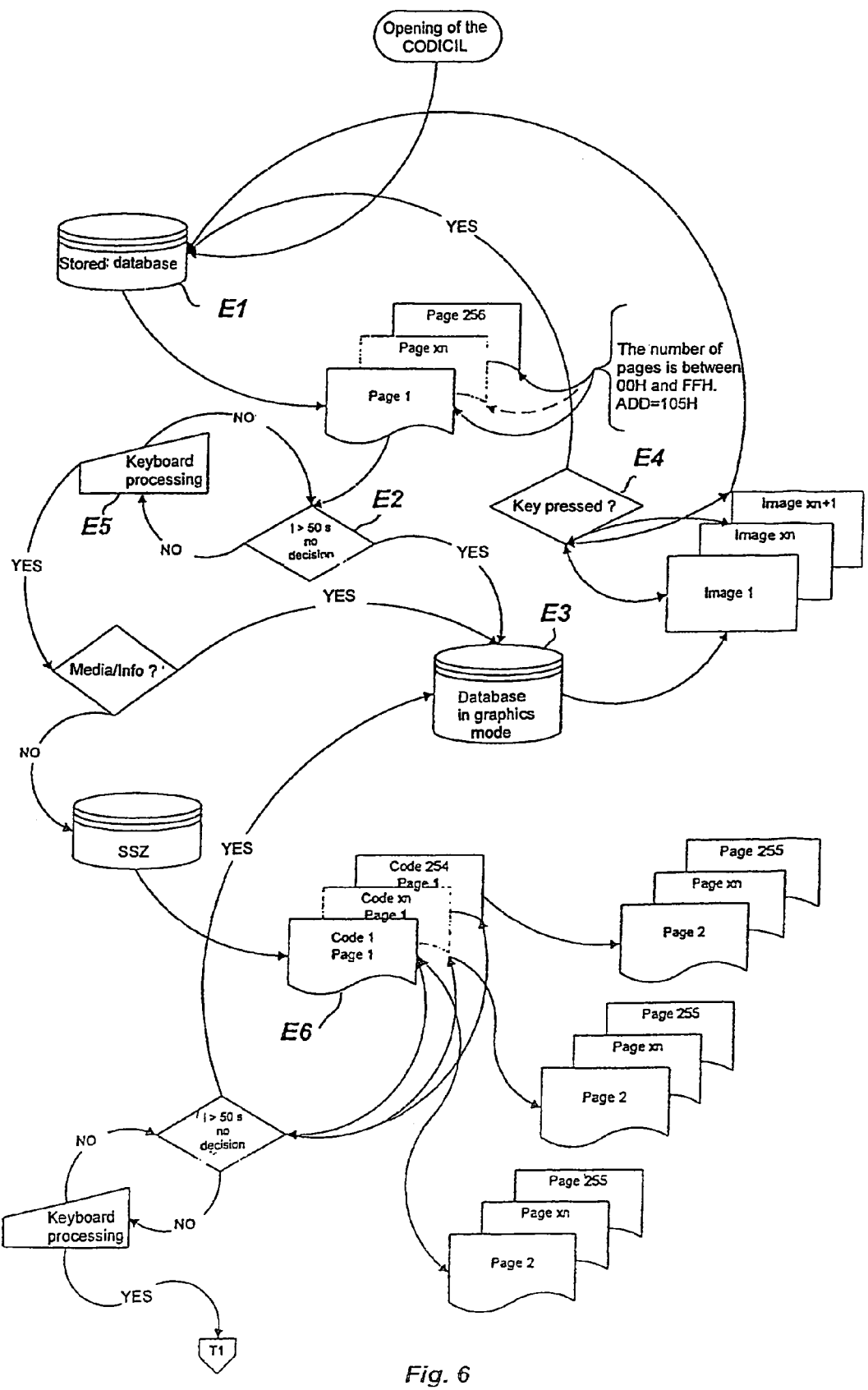
FIGS. 6 and 7 show the flowchart of the operation of the device according to the invention.
Figure 7:
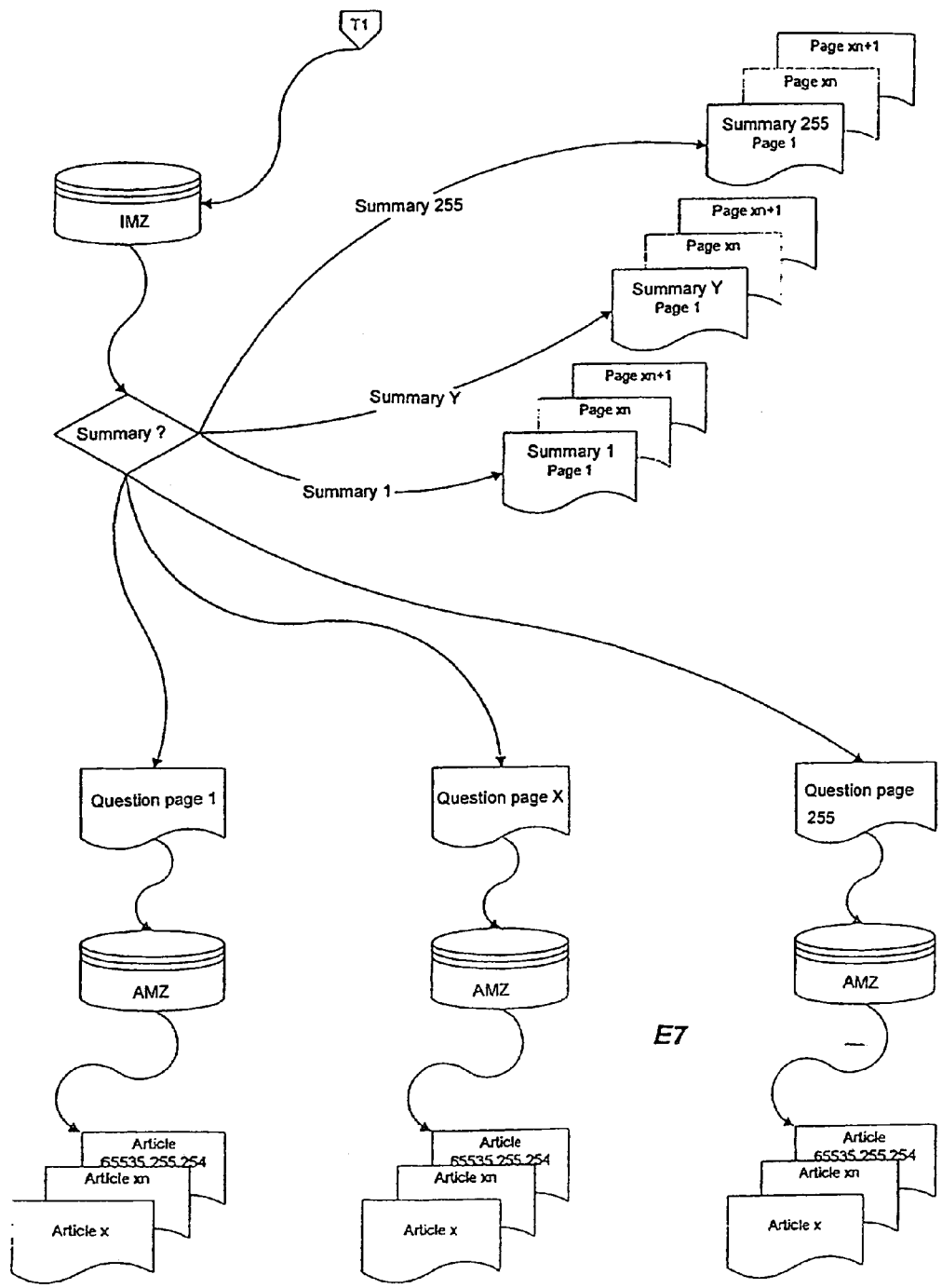

The manner of operation of the device is illustrated in FIGS. 6 and 7.

On opening the device according to the invention (with a memory card already inserted in its housing), the stored database gives, as starting information, the number of pages to be displayed and the start address of the text mode (step E1).

A time delay step E2 makes it possible to detect whether there is a long delay without data input from the keyboard.

In this case, the device accesses the database in graphics mode (step E3), giving the number of images to be displayed and the start address, and which contains for example advertising screens or other information.

For as long as all the images have not been displayed, or no key depression on the keyboard has been detected, graphics display continues. On the other hand, if a key has been pressed (step E4) or all the images have been displayed, the program returns to step E1, to the stored database and to the first page displayed (a page showing the contents of the text memory, for example).

During processing of a keystroke (step E5), a succession of hierarchical menus permits access either to graphical information (return to step E3), or (step E6) to various stored codes (if legal codes are stored), and, in a chosen code, access to a particular page (step E7), identified for example by the number of an article of law in a list.

More precisely, when there is user input via the keyboard (step E5), corresponding to a choice of legal code or of subject for example, the Summary Survey Zone SSZ, based on 8 octets (bytes), makes it possible to define the number of pages to be displayed, and the corresponding memory allocation.

A new keystroke is then awaited from the user, and a time delay of 50 seconds without reaction can return to the database in graphics mode.

The Identification Memory Zone IMZ, based on 16 bytes, then defines the number of the table of the material selected, the code number, the end address of the article requested, the start address of article 1 or of text, and the memory address for articles.

Finally, the Article Memory Zone AMZ, based on 8 bytes, which has an article zone on 2 bytes, and memory address zones of the articles (on 3 bytes), permits display of the information requested (article chosen, for example).

During data input by the user, the keyboard then permits either page scrolling forwards or backwards using the "+" and "−" keys (15 and 16), or direct selection of an item from a list by entering codes on the numeric keypad (keys 0 to 9).

Operation is under the control of a program, stored in a memory of the microcontroller card 28, and executed by the microcontroller 11.

Variants

As the device according to the invention is equipped with a I2C internal communication bus 10, a number of options can be proposed.

For example, it is possible to drive several screens for the case when it is used as a digital pocket book, to obtain information via an operator so as to be able to be informed of important events in real time, or, for use by the police, to have visual information about a wanted notice, or, for a lawyer, to follow developments for draft laws, legal proceedings that are in progress, etc.

The man/machine interface can be adapted depending on the application selected. The option for dialogue with a computer makes it possible, by means of software developed for this application, for the user to use the device according to the invention solely as a databank, in the case when the user wishes to alter the pagination of the documents or article to be printed.

In a variant that is economical in terms of cost of manufacture, adapted to mass production, it is possible to develop an ASIC component, intended to replace the microcontroller card 28, in order to reduce the volume of components.

In one variant, a new microcontroller card 28 of the smart-card type can be developed in Java.

The scope of the present invention is not limited to the details of the above embodiments considered as an example, but on the contrary extends to modifications within the capacity of a person skilled in the art.

What is claimed is:

1. A device for the storage and searching of textual and graphical information in electronic form, said device comprising a case (1), a display means (9), a user interface means (3), an operating means (11), a means for storage (5)

of said information, a means of selecting information to be displayed according to the user's instructions, and a multiplexed address bus (10).

2. A device according to claim 1, wherein the operating means (11) is an eight-bit processor combined with an IPP (Intelligent Programmable Peripheral).

3. A device according to claim 2, wherein the multiplexed address bus is a type I2C internal communication bus (10).

4. A device according to any one of the claims 1 to 3, wherein the storage means (5) is a memory card (5) that can be removed from case (1).

5. A device according to claim 3, wherein the storage means (5) comprises memory components (22) for storing textual and graphical information that can be consulted by the user, a memory component (23) serving as memory for identification and personalization of the storage means (5), a decoder component (24), intended for selecting the three eight-bit I2C bus decoder components (25) for addressing the memory components (22), and a bus decoder component (26) adapted for transferring the stored information read in memory components (22) to the I2C bus (10).

6. A device according to claim 1, further comprising a printer port (6).

7. A device according to claim 1, wherein the textual information is stored in the form of text only.

8. A device for the storage and searching of textual and graphical information in electronic form comprising:
    a case;
    a display mounted within the case;
    a user interface device mounted within the case;
    a processor connected to the display and user interface device
    a removable memory, removably connected to the processor, that stores the textual and graphical information;
    a program for selecting the textual and graphical information stored in the removable memory that is to be displayed according to a user's instructions; and
    a multiplexed address bus connected between the removable memory and the processor for transmitting the selected information between the removable memory and the processor.

9. The device according to claim 8, wherein the removable memory comprises:
    first memory components that store textual and graphical information that can be consulted by the user;
    second memory components that store identification and personalization information to identify and personal the removable memory;
    a decoder component that selects one of the first and second memory components;
    three eight-bit bus decoder components for addressing the first memory components; and
    a bus decoder component for transferring the stored information read in the first memory components to the multiplexed address bus for transmission to the processor.

* * * * *